| United States Patent | [15] | 3,675,009 |
| Kraus | [45] | July 4, 1972 |

[54] CARBON BLACK BLENDING IN RUBBER

[72] Inventor: Gerard Kraus, Bartlesville, Okla.

[73] Assignee: Phillips Petroleum Company

[22] Filed: May 18, 1970

[21] Appl. No.: 38,523

[52] U.S. Cl. .............................. 250/49.5 R, 23/230 R, 73/8, 73/146, 250/49.5 A
[51] Int. Cl. ....................................... G01n 23/04
[58] Field of Search ................ 73/432 PS, 8, 146; 152/151; 23/230 R, 230 M; 250/49.5 A

[56] References Cited

UNITED STATES PATENTS 3,397,583  8/1968  Sperberg..............................73/432 R Primary Examiner—James W. Lawrence
Assistant Examiner—C. E. Church
Attorney—Young and Quigg

[57] ABSTRACT

A method has been developed for predicting the relative abrasion index of a rubber into which carbon black is blended, depending upon a particle size distribution relationship of the carbon black.

6 Claims, No Drawings

CARBON BLACK BLENDING IN RUBBER

This invention relates to carbon black blending into rubber.

In one of its more specific aspects, this invention relates to a method of selecting carbon blacks for incorporating in rubber on the basis of the wear characteristics desired in the finished rubber.

It is known that the degree of reinforcement imparted to tread rubber, particularly of automobile tires, upon the incorporation thereinto of carbon black, is dependent upon such properties of the carbon black as structure, surface area and average particle size. This invention provides a method for determining the extent to which wear characteristics, e.g., abrasion resistance, will be imparted to the final rubber blend as a result of a relationship involving the particle size distribution of the carbon black.

Accordingly, this invention provides a method of selecting a carbon black for incorporating in rubber on the basis that a particle size heterogeneity index of the carbon black is relatable to the abrasion characteristics of the rubber into which it is incorporated and enables the production of a rubber having a certain abrasion index.

Accordingly, it is an object of this invention to facilitate the predictability of properties of rubbers.

It is another object of this invention to enable the production of certain quality carbon blacks.

These and other objects of this invention will be apparent from the following discussion.

In incorporating carbon black into rubber, it is known that carbon blacks in the range of a specific surface area of 70 to 150 square meters per gram, as determined by the conventional testing procedure employing nitrogen, impart improved resistance to wear in rubber-carbon black formulations, for example, in tire tread formulations. It has now been determined that of a plurality of carbon blacks having otherwise substantially identical properties, particularly of surface area and structure, that individual carbon black in which the surface area is contributed by the narrowest distribution of particle sizes will impart the greater wear resistance to resulting rubber blend into which it is blended.

Specifically, it has been determined that the particle size distribution, as it affects the wear characteristics or rubber, can be expressed in terms of a ratio, herein termed a heterogeneity index, and for any group of otherwise comparable carbon blacks, that black having the lowest heterogeneity index will impart to the rubber the greatest wear resistance when incorporated therein.

The heterogeneity index, H, may be expressed as $$H = \frac{\overline{D^3}}{\overline{D^2} \cdot \overline{D}}$$

in which formula $\overline{D}$ is the number-average particle diameter, the particle diameter being defined as the diameter of the basic units making up the structure aggregates of the carbon black. $\overline{D^3}/\overline{D^2}$ is the area-average particle diameter. H is then seen to be the ratio of the area-average diameter to the number average diameter.

The terms "number-average" and "area-average" are defined as follows:

$$\text{"Number-average"} = \frac{\Sigma N_i D_i}{\Sigma N_i}$$

$$\text{"Area-average"} = \frac{\Sigma N_i D_i^3}{\Sigma N_i D_i^2}$$

wherein $N_i$ equals the number of particles of diameter $D_i$.

Particle size distribution is determined in the conventional manner from the frequency and diameter analysis of electron micrographs produced by an electron microscope.

In the commercial application of this invention, it is a simple matter to determine the heterogeneity index of the various blacks available and to select, for the incorporation into that rubber intended to have the greatest wear resistance, that black having the lowest heterogeneity index. Relatedly, once the heterogeneity index of any available black has been determined and a correlation established between that index and the wear resistance of rubber into which it is compounded, it is a simple matter to select a particular black to meet the wear requirements of a rubber blend. Generally, heterogeneity indices of present commercially available blacks will be between about 1.2 and about 2.1.

The method of this invention is illustrated by the following example in which heterogeneity indices were determined for two blacks having substantially equal surface areas and structures. Each of the blacks was then incorporated into a rubber from which blend an automobile tire tread was produced. The abrasion index was determined for each of the rubbers in a tire test. Results were as follows:

| Carbon Black | 1 | 2 |
|---|---|---|
| nitrogen surface area, m.²/g. | 93 | 90 |
| structure, DBP, cc./100 g. | 120 | 122 |
| heterogeneity index (H) | 1.20 | 1.28 |
| tire test abrasion index at 12,000 miles[a] | 106 | 100 |

(a) relative values in respect to each other.

It will be seen from the above data that the tire produced from that rubber having in it the black with the lower heterogeneity index had the higher abrasion index. This is particularly significant inasmuch as there existed only a comparatively small numeral difference between the heterogeneity indices.

Inasmuch as high abrasion resistance is not a requirement of all rubber, it will be seen that this invention provides an excellent method of producing blacks which impart to rubber no more than the necessary wear characteristics when incorporated therein. Inasmuch as this index can be varied by altering the operating conditions of the carbon black production process and since it appears that any method which affects the heterogeneity index will affect the abrasion resistance of the rubber, it is possible to operate the carbon black production process to produce a black of a selected heterogeneity index. In doing so, it may then be possible to produce blacks with desired heterogeneity indices at increased carbon black yields with decreased operating costs being attendant thereto.

It is evident from the foregoing that various modifications can be made to the method of this invention. Such, however, are considered as being within the scope of the invention.

What is claimed is:

1. A method of selecting a carbon black for incorporating in a rubber recipe to produce a rubber having desired abrasion properties, said abrasion properties being substantially influenced by the properties of said carbon black, which comprises:

a. determining the heterogeneity index for each of said carbon blacks, said heterogeneity index being represented by the formula $$H = \frac{\overline{D^3}}{\overline{D^2} \cdot \overline{D}}$$

in which H is the heterogeneity index, and $\overline{D^3}$, $\overline{D^2}$ and $\overline{D}$ are the number averages of the cube, square and first power of the particle diameters of said carbon blacks;

b. correlating the heterogeneity index of each of said carbon blacks with the abrasion properties of rubber into which each of said carbon blacks is individually blended to establish a correlation between said heterogeneity indices of said blacks and the abrasion properties of said rubber; and, c. employing said correlation to select a carbon black which upon incorporation in a rubber recipe produces a rubber having desired abrasion properties.

2. The method of claim 1 in which said carbon blacks have specific surface areas of from 70 to 150 square meters per gram.

3. The method of claim 1 in which said carbon blacks have substantially equal structure and surface area.

4. The method of claim 1 in which said particle diameters of said carbon blacks are determined by electron microscope.

5. The method of claim 1 in which said heterogeneity indices are between 1.2 and about 1.3.

6. The method of claim 1 in which said heterogeneity indices are between 1.2 and 2.1.

* * * * *